April 5, 1938.    U. FRISINA    2,113,343

NONSKIDABLE PLATE

Filed Aug. 18, 1937

INVENTOR
Umberto Frisina
By Ralph Burch
Attorney

Patented Apr. 5, 1938

2,113,343

UNITED STATES PATENT OFFICE 2,113,343

NONSKIDABLE PLATE

Umberto Frisina, Cranbrook, British Columbia, Canada

Application August 18, 1937, Serial No. 159,779
In Canada September 25, 1936

2 Claims. (Cl. 152—14)

This invention relates to new and useful improvements in an anti-skid tire plate.

The primary object of the invention is a wide studded plate for attachment to tires to prevent skidding, the width of the plate giving a definite flat surface for the tire to take a grip on rather than the customary narrow plate or chain now in use which will dig into the ice or snow and out again before the tire gets a chance to grip.

A further object is a pair of semi-circular tapering projections on either side of the plate to prevent the tire from slipping sideways and to keep it in its track, and also to provide excellent gripping power.

A further object is a plate as described with additional studs on its surface to provide further gripping power.

A further object is a plate as described above with an opening across the middle to allow snow or ice to come through and prevent it collecting under the plate.

A still further object is an anti-skid tire plate of sturdy construction, curved to fit the tire, and having hooks on either side with which to fasten the plate to the tire chain.

Figure 1:
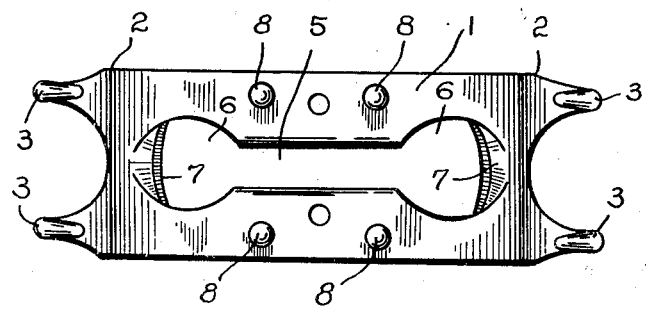
Figure 2:
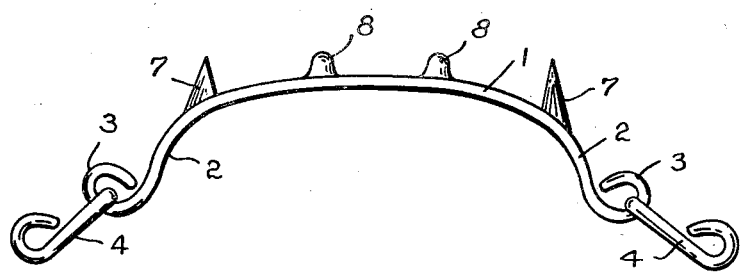

With these and other objects in view that may appear as the description proceeds it will be seen that my invention consists in the novel construction and arrangement of parts as hereinafter more specifically set forth, and illustrated in the accompanying drawing, and in which:

Fig. 1 is a plan view of my anti-skid tire plate.
Fig. 2 is a side elevation of the same.

Referring more in detail to the drawing in which similar reference characters designate corresponding parts it will be seen that my invention consists of a wide flat plate 1, curved downward at either end at 2, to fit around a tire, and having reversed curved projections at each corner ending in hooks 3, to which are fastened the chain links 4.

The center of the plate has an opening 5 widening out at either end at 6. A pair of half circular or half conical projections 7 tapering upward, rise from the ends of openings 6, and these projections provide means for preventing the tire from slipping sideways and also gives the plate great gripping power. A plurality of studs 8 mounted on top of plate 1 give it additional gripping power.

The plate is easily attachable to the ordinary tire chain instead of the links, or individual plate may be strapped around the tire if desired.

It is believed the above description in conjunction with the attached drawing will give full details of the construction of my novel anti-skid plate, but I wish it to be understood that minor changes or alterations may be made within the spirit of the invention and what I wish to claim by Letters Patent is the following.

I claim:

1. In an anti-skid tire plate comprising a wide flat curved plate, an opening across the center of said plate widening at either side, a pair of half conical projections rising at either side of plate to prevent tire from slipping sideways, means for attaching said plate to a tire.

2. In an anti-skid tire plate comprising a wide flat curved plate, an opening across the center of said plate and widening at either end, a pair of half conical shaped projections rising from the ends of said opening to provide a gripping means and to prevent tire from slipping sideways, a plurality of studs on the face of said plate, curved hooks for attaching the plate to tire chain, substantially as described.

UMBERTO FRISINA.